June 18, 1935.  W. A. RIDDELL  2,005,394

AUTOMATIC PHOTOGRAPHIC SHUTTER

Filed Sept. 14, 1934   2 Sheets-Sheet 1

Inventor:
William A. Riddell,

By

Attorneys

June 18, 1935.  W. A. RIDDELL  2,005,394

AUTOMATIC PHOTOGRAPHIC SHUTTER

Filed Sept. 14, 1934  2 Sheets-Sheet 2

Inventor:
William A. Riddell,

By
Attorneys

Patented June 18, 1935

2,005,394

UNITED STATES PATENT OFFICE 2,005,394

AUTOMATIC PHOTOGRAPHIC SHUTTER

William A. Riddell, Rochester, N. Y., assignor to Eastman Kodak Company, Rochester, N. Y., a corporation of New York Application September 14, 1934, Serial No. 743,999

13 Claims. (Cl. 95—63)

This invention relates to photography and more particularly to shutters for photographic cameras.

One object of my invention is to provide a shutter for photographic cameras including mechanism for automatically operating the shutter after a predetermined time interval. Another object of my invention is to provide a shutter with automatic operating mechanism mounted as a unit so that the shutter can be sold with or without the automatic operating mechanism. Another object of my invention is to provide a shutter operating mechanism with a latching plate, this plate being so arranged that it may be actuated by the trigger when in one position, and so that it may also prevent the normal operation of the shutter by means of the trigger, except at such times as the shutter is in position for normal exposures. Another object of my invention is to provide a shutter operating mechanism which may be operated by moving the shutter trigger through a portion of its normal movement. Another object of my invention is to provide a control for a photographic shutter in which tensioning the spring of the shutter operating mechanism renders the shutter trigger inoperative for operating the shutter mechanism. Other objects will appear from the following specification, the novel features being particularly pointed out in the claims at the end thereof.

Coming now to the drawings wherein like reference characters denote like parts throughout:

As a preferred embodiment of my invention I have shown my automatic shutter operating mechanism as applied to a simple type of shutter now on the market, although such a shutter operating mechanism can be easily applied to a variety of different types of shutters.

Figure 1:
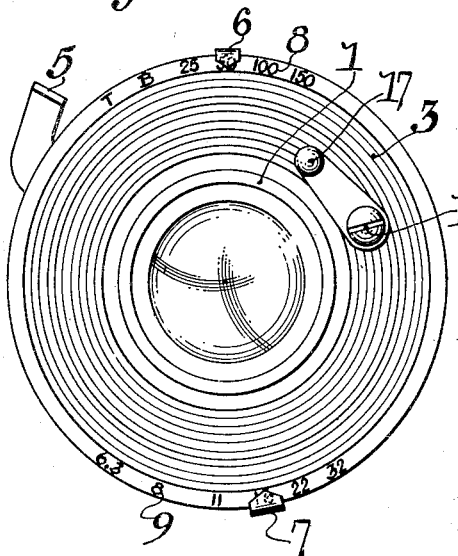
Fig. 1 is a typical shutter constructed in accordance with and embodying a preferred form of my invention.

As shown in Fig. 1, the shutter may consist broadly of a shutter casing, including a forwardly extending tube 1 carrying the front objective element 2. A cover plate 3 surrounds the lens tube 1 and covers the upstanding wall 4 of the shutter in a well known manner. The shutter may be provided with the usual trigger 5, which can be depressed to make an exposure, and with the setting levers 6 and 7. Lever 6 is adapted to be positioned over the scale 8 to indicate the type or duration of exposure for which the shutter mechanism is set, and lever 7 may be adjusted over a diaphragm scale 9 which will indicate the diaphragm opening. As thus far described, the shutter is a simple type widely used on photographic cameras.

Figure 2:
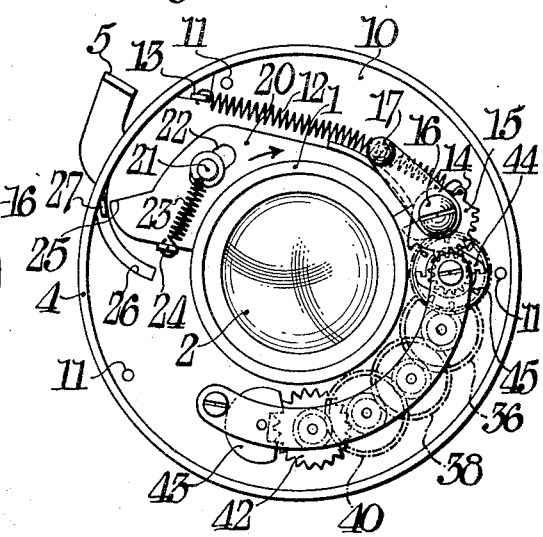
Fig. 2 is a top plan view of the shutter with the shutter cover plate removed, showing the automatic shutter operating mechanism in an inoperative position, so that the shutter may be operated through the trigger in the usual manner.

In order to provide a relatively simple mechanism which will permit an operator to start supplementary shutter mechanism so that he can also appear in the picture, I have provided the mechanism best shown in Fig. 2. This automatic shutter operating mechanism may consist of an annular plate 10 adapted to fit into the shutter casing below the top of the shutter wall 4 and around the forwardly extending lens tube 1. This plate is removable as a unit, but may be held in place by means of screws passing through the apertures 11. These screws may also be used to hold on the shutter cover, if desired.

The annular plate 10 is provided with a power spring 12 which is connected to an upstanding lug 13 which may be bent from the plate 10 at one end, and which is connected to a lug 14 on the gear segment 15 which is attached to move with a post 16. This post carries a setting lever 17 which is shown in its inoperative position in Figs. 1 and 2 and in its operative or set position in Fig. 3. The power spring 12 tends to rotate the gear segment 15 in the direction shown by the arrow in Fig. 3.

The gear segment 15 is provided with a lug 18 adapted to engage an upstanding flange 19 on the latching plate 20 which is preferably arcuate in shape so that it may slide around the periphery of the lens tube 1. A stud 21 passing through an aperture 22 in this plate limits its possible movement. A spring 23 connected to the stud 21 and to a lug 24 tends to move the latching plate in the direction shown by the arrow in Figs. 2 and 3.

Figure 3:
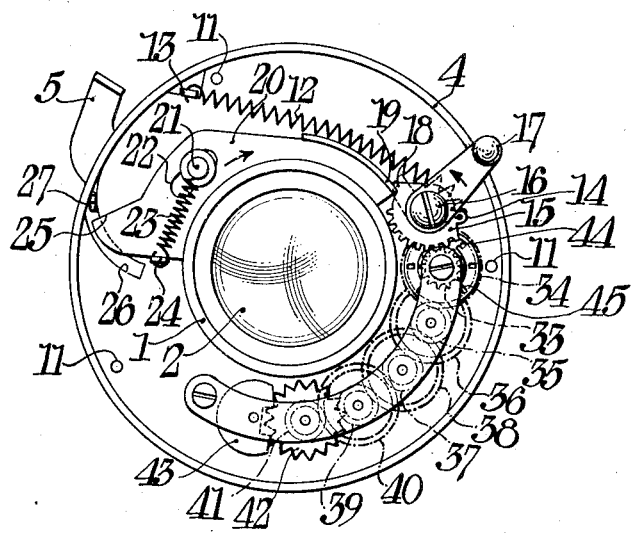
Fig. 3 is a similar view, but with the automatic shutter operating mechanism in position to actuate the shutter.
Figure 4:
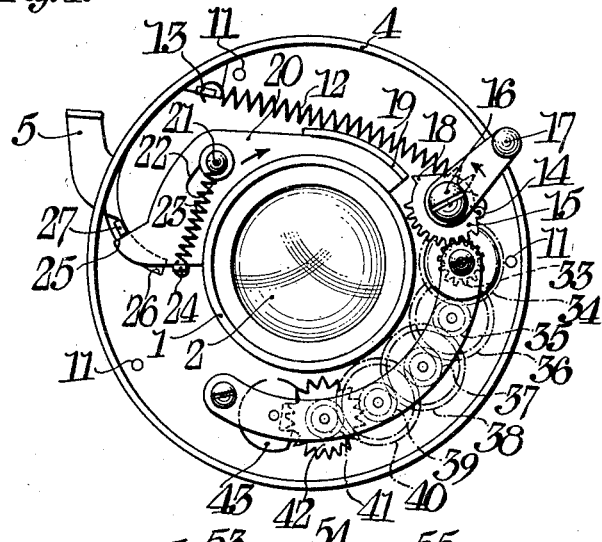
Fig. 4 is a similar view illustrating the position of the parts just as the shutter trigger has been depressed to start the automatic shutter operating mechanism in motion.

Thus when the setting lever 17 is turned to the position shown in Fig. 3, the lug 18 will be engaged by the flange 19 and the latching plate 20 will lie with the cam surface 25 partially across the slot 26, through which a lug 27, carried by the camera trigger 5, may pass. This performs two functions: First, by positioning the cam surface 25 in the path of the lug 27, by depressing the trigger 5 the lug 27 will engage the cam surface and move the latching plate 20 against the action of spring 23 so that the lug 18 and the flange 19 will be moved to the position shown in Fig. 4, in which the automatic shutter actuator is free to turn under the impulse of its power spring 12. Second, as will be noted from Fig. 4, when the lug 27 of the trigger 5 engages the cam surface 25 and moves the latching plate 20 against the action of spring 23, this plate can only move until the slot 22 reaches the stud 21. The trigger, therefore, cannot be depressed so as to pass the lug 27 further down through the slot 26 as is necessary to operate the shutter mechanism. The shutter mechanism must, therefore, be actuated by a supplemental means which will now be described.

Figure 6:
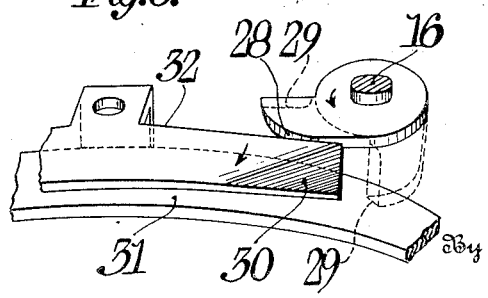
Fig. 6 is a fragmentary perspective view of parts of the automatic shutter operating mechanism and the shutter master member.

Referring to Fig. 6, the post 16 which carries the gear segment 15 also carries beneath the plate 10 an operating cam 28. This cam may be moved through approximately 90° as the setting lever 17 is moved from the position shown in Fig. 2 to that shown in Fig. 3, the cam moving in the direction shown by the arrow in Fig. 6 when the post 16 is moving under the impulse of the power spring 12. When the post 16 is moved in a reverse direction for setting, by moving the handle 17 from the position shown in Fig. 1 to that shown in Fig. 3, a beveled wall 29 on the cam rides up over the slanting spring arm 30, which forms a part of the master member 31 by which the shutter mechanism is operated. The arm 30 is a spring arm and will readily pass under the operating cam when it is being moved to a set position. When, however, this cam is driven by the post 16, the cam surface 28 contacts with and drives arm 30 through the arm surface 32 causing the master member to swing in the direction shown by the arrow in Fig. 6, so that an exposure is made, as will be more fully described hereinafter.

The movement of the operating cam 28 is controlled to the desired extent by means of a gear train and pallet. This gear train may consist of the gear segment 15 and the following gears—33, 34, 35, 36, 37, 38, 39, 40, and 41. Gear 41 may be attached to a starwheel 42 which may operate a pallet 43, if desired. This type of gear train can be arranged to give the desired time interval between the starting of the automatic shutter operating mechanism and the operation of the master member which makes the exposure. This may be ten seconds or any time determined by the manufacturer.

In order to prevent turning all of the gears of the gear train and the pallet in a reverse direction in setting the shutter, I prefer to provide a one-way clutch, best shown in Fig. 2, where the clutch may consist of a pair of downwardly extending spring arms 44 adapted to engage in any pair of apertures 45 in the gear 34. Thus when the shutter is being set, these spring arms slide over the upper surface of the gear 34, but when the gear 15 is being driven by the spring 12, the spring arms 44 engage pairs of apertures 45 and drive the entire gear train. This one-way clutch is well known in the shutter art.

Figure 5:
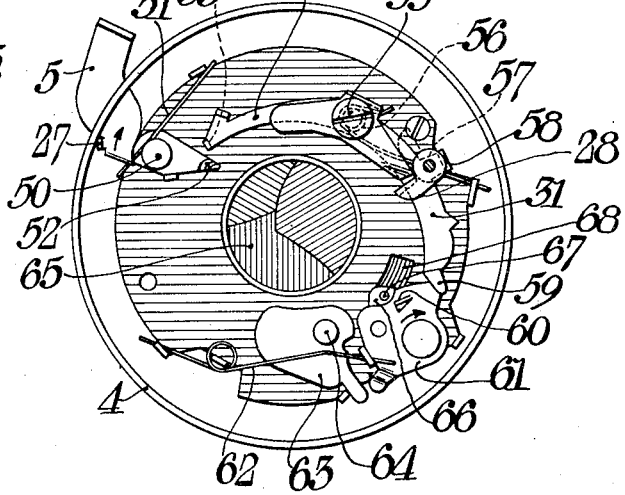
Fig. 5 is a similar view of a shutter, but with the plate carrying the automatic shutter operating mechanism removed to disclose the shutter mechanism.

While, as above explained, this shutter actuating mechanism may be attached to almost any type of well-known shutter construction, I have shown it as being applied to a shutter of a well-known type, best shown in Fig. 5. The shutter trigger 5 may be mounted to turn on a stud 50 and is held in the position shown in Fig. 5 by means of a spring 51 which tends to move the shutter trigger in the direction shown by the arrow. The shutter trigger includes an operating cam 52 which is adapted, when turned, to engage the downwardly extending lug 53 on the master member 54 which is pivoted upon the stud 55. The cam 52 is so shaped that by depressing the trigger 5, it engages the lug 53 and drives the master member until these parts slip apart due to the master member and trigger turning upon the spaced pivots 50 and 55. After the exposure is made and the trigger is released, the trigger rides under the cam 53 without moving the master member 54, as is well known in shutter construction.

The master member 54 is provided with a power spring 56 which encircles the stud 55 and which normally holds the master member in the position shown, with lug 57 resting against a stop 58. However, when the master member 54 is moved by the trigger 5 to tension the spring 56, the end 59 of the master member is caused to swing over the upstanding lug 60 carried by the shutter leaf operating member 61, and as the lug 53 of the master member slips off the operating cam 52 of the shutter trigger, the end 59 of the master member engages the lug 60 and by it swings the blade operating member 61 rapidly in the direction shown by the arrow. As soon as these parts 59 and 60 slip off, member 61 immediately returns to the position shown in Fig. 5 under the impulse of its spring 62.

The weight 63, pivoted upon the stud 64, is merely for slowing up the action of the shutter leaves 65 which are moved by a blade ring in the usual manner as the operating member 61 moves the link 66, which, through the pin 67, moves the blade ring 68.

It is to be distinctly understood that the shutter mechanism itself, as shown in Fig. 5, does not form a part of this invention, since it is the mechanism of a well known type of shutter except for the fact that the master member 54 has been provided with the spring arm 30 which cooperates with my automatic shutter operating mechanism which has been fully described above.

It should be noted that my automatic shutter operating mechanism is all assembled completely on a plate 10, this plate being so shaped that it may be dropped into a shutter casing and enclosed therein by means of the shutter cover 3. Thus the shutter can be sold with or without the automatic shutter operating mechanism, and if sold without the automatic mechanism, this may be added later by merely changing the shutter cover 3 and adding the plate 10 with the automatic shutter actuating mechanism mounted thereon.

Having thus described my invention, what I claim as new and desire to secure by Letters Patent of the United States is:

1. In a photographic shutter including shutter leaves, leaf operating mechanism, and a movable trigger for controlling the leaf operating mechanism, the combination with an automatic shutter operating mechanism, of a latching plate movably mounted with respect to the trigger and automatic shutter operating mechanism and adapted to hold one or the other against sufficient movement to operate the shutter leaves.

2. In a photographic shutter including shutter leaves, leaf operating mechanism, and a movable trigger for controlling the leaf operating mechanism, the combination with an automatic shutter operating mechanism, of a latching plate movably mounted with respect to the trigger and automatic shutter operating mechanism and adapted to hold one or the other against sufficient movement to operate the shutter leaves, said latching plate being also adapted to lie in the path of movement of the trigger whereby movement of the trigger may move the latching plate.

3. In a photographic shutter including shutter leaves, leaf operating mechanism, and a movable trigger for controlling the leaf operating mechanism, the combination with an automatic shutter operating mechanism, of a latching plate movably mounted with respect to the trigger and automatic shutter operating mechanism and adapted to hold one or the other against sufficient movement to operate the shutter leaves, said latching plate being also adapted to lie in the path of movement of the trigger whereby movement of the trigger may move the latching plate, and a spring tending to hold the latching plate toward the automatic shutter operating mechanism.

4. In a photographic shutter including shutter leaves, leaf operating mechanism, and a movable trigger for controlling the leaf operating mechanism, the combination with an automatic shutter operating mechanism, of a latching plate movably mounted with respect to the automatic shutter operating mechanism, a spring setting lever included in the shutter operating mechanism adapted to be moved to tension the spring, a latch element included in the shutter operating mechanism, said latching plate being adapted to engage said latch element and hold the shutter operating mechanism against movement.

5. In a photographic shutter including shutter leaves, leaf operating mechanism, and a movable trigger for controlling the leaf operating mechanism, the combination with an automatic shutter operating mechanism, of a latching plate movably mounted with respect to the automatic shutter operating mechanism, a spring setting lever included in the shutter operating mechanism adapted to be moved to tension the spring, a latch element included in the shutter operating mechanism, said latching plate being adapted to engage said latch element and hold the shutter operating mechanism against movement, said latching plate lying in the path of and being adapted to be engaged by the trigger whereby the automatic shutter mechanism may be tripped by said trigger.

6. In a photographic shutter including shutter leaves, leaf operating mechanism, and a movable trigger for controlling the leaf operating mechanism, the combination with an automatic shutter operating mechanism, of a latching plate movably mounted with respect to the automatic shutter operating mechanism, a spring setting lever included in the shutter operating mechanism adapted to be moved to tension the spring, a latch element included in the shutter operating mechanism, said latching plate being adapted to engage said latch element and hold the shutter operating mechanism against movement, said latching plate lying in the path of and being adapted to be engaged by the trigger whereby the automatic shutter mechanism may be tripped by said trigger, a spring for holding the latching plate in engagement with said latching element, a cam surface on the latching plate adapted to lie in the path of the trigger when said plate is in latching position whereby movement of the trigger is limited to such an extent that the trigger is inoperative to operate the shutter mechanism and operative to move the latching plate and through it release the automatic shutter operating mechanism.

7. In a photographic shutter including shutter leaves, leaf operating mechanism, and a movable trigger for controlling the leaf operating mechanism, the combination with power operated shutter operating mechanism, of a latching plate movably mounted and having one position to limit the trigger movement, and another position to permit normal movement thereof whereby said trigger may operate the shutter leaf operating mechanism.

8. In a photographic shutter including shutter leaves, leaf operating mechanism, and a movable trigger for controlling the leaf operating mechanism, the combination with power operated shutter operating mechanism, of a latching plate movably mounted and having one position to limit the trigger movement, a setting device for placing the automatic shutter operating mechanism in condition to operate the shutter leaf operating mechanism, said latching plate when in said position being adapted to hold said automatic mechanism against movement, said trigger being adapted to move said latching plate to release the automatic shutter operating mechanism to a second position in which said latching plate will still limit the normal movement of the trigger.

9. In a photographic shutter including shutter leaves, leaf operating mechanism, and a movable trigger for controlling the leaf operating mechanism, the combination with power operated shutter operating mechanism, of a latching plate movably mounted and having one position to limit the trigger movement, a setting device for placing the automatic shutter operating mechanism in condition to operate the shutter leaf operating mechanism, said latching plate when in said position being adapted to hold said automatic mechanism against movement, said trigger being adapted to move said latching plate to release the automatic shutter operating mechanism to a second position in which said latching plate will still limit the normal movement of the trigger, and a spring adapted to move the latching plate to a third position in which the trigger may be freely operated to its full extent.

10. In a photographic shutter including operating mechanism, a trigger for moving the operating mechanism and a casing, the combination with a plate adapted to fit into the shutter casing, a power operated member carried by the plate and adapted to engage and move the operating mechanism, a latching plate forming a control for the power operated mechanism movably mounted on the plate and adapted to be moved to and from a position in which it may limit the movement of the trigger and render the trigger inoperative for moving the operating mechanism.

11. In a photographic shutter including operating mechanism, a trigger for moving the operating mechanism and a casing, the combination with a plate adapted to fit into the shutter casing, a power operated member carried by the plate and adapted to engage and move the operating mechanism, a latching plate forming a control for the power operated mechanism movably mounted on the plate and adapted to be moved to and from a position in which it may limit the movement of the trigger and render the trigger inoperative for moving the operating mechanism, and means for moving the latching plate operable from outside the shutter casing.

12. In a photographic shutter including operating mechanism, a trigger for moving the operating mechanism and a casing, the combination with a plate adapted to fit into the shutter casing, a power operated member carried by the plate and adapted to engage and move the operating mechanism, a latching plate forming a control for the power operated mechanism movably mounted on the plate and adapted to be moved to and from a position in which it may limit the movement of the trigger and render the trigger inoperative for moving the operating mechanism, and means for moving the latching plate operable from outside the shutter casing, said means also being adapted to position the power operated mechanism for operating the shutter.

13. In a photographic shutter including operating mechanism, a trigger for moving the operating mechanism and a casing, the combination with a plate adapted to fit into the shutter casing, said plate carrying as a unit an automatic shutter actuating mechanism including a latching plate, spring motor and a cam adapted to engage and drive the shutter operating mechanism, said latching plate being movably mounted and adapted to control the movement of the shutter trigger.

WILLIAM A. RIDDELL.